Figure 1:
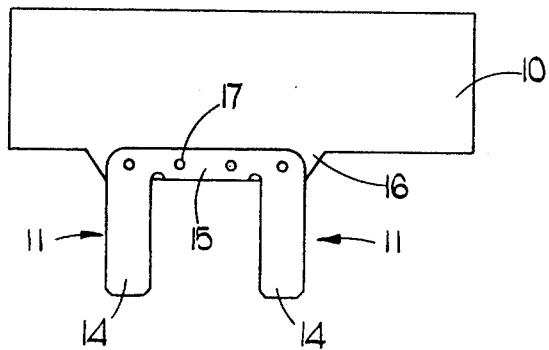

United States Patent [19]
Yeomans et al.

[11] 3,989,318
[45] Nov. 2, 1976

[54] BEARING ASSEMBLY

[75] Inventors: David Robert Yeomans, Sutton Coldfield; Eric Norman Cook, Birmingham, both of England

[73] Assignee: The Lucas Electrical Company Limited, Birmingham, England

[22] Filed: July 1, 1975

[21] Appl. No.: 592,234

[30] Foreign Application Priority Data
July 9, 1974    United Kingdom............... 30312/74

[52] U.S. Cl. ................................................ 308/30
[51] Int. Cl.² ......................................... F16C 35/00
[58] Field of Search .............................. 308/27–34, 308/237 R, 237 A, 15

[56] References Cited
UNITED STATES PATENTS

| | | | |
|---|---|---|---|
| 874,062 | 12/1907 | Gade | 308/30 |
| 1,179,638 | 4/1916 | Livesay et al. | 308/27 |
| 1,387,044 | 8/1921 | Fitzgerald | 308/30 |

*Primary Examiner*—Robert R. Song
*Assistant Examiner*—Gene A. Church
*Attorney, Agent, or Firm*—Holman & Stern

[57] ABSTRACT

A bearing assembly for rotatably supporting a member comprises a bearing fitted into a sleeve, and a pair of mounting brackets brazed to the sleeve so that the sleeve is held between the brackets. Each bracket has an integral flange to which is integrally connected a further, identical bearing assembly, and the brackets are secured to the said member by rivetting the flanges thereto.

4 Claims, 2 Drawing Figures

BEARING ASSEMBLY

This invention relates to a bearing assembly for rotatably supporting a member and is more particularly, though not exclusively, concerned with a bearing assembly for rotatably supporting a vane in a vane type pump.

It has previously been proposed to provide a bearing assembly for a vane in a vane type pump by inserting a bush into a cylindrical aperture in a one piece pressing, brazing the bush in position in the pressing, passing integral limbs on the one piece pressing either side of the vane, performing a rivetting operation so as to sandwich the vane between the limbs, fine boring the bush after rivetting, and subsequently pressing the bearing into position in the bush.

A disadvantage of the above mentioned bearing assembly is that the rivetting operation distorts the one piece pressing adjacent the limbs and introduces high stresses.

It is an object of the present invention to obviate or mitigate the above disadvantage.

According to the present invention, there is provided a bearing assembly for rotatably supporting a member, said assembly comprising a bearing, a sleeve into which the bearing is fitted, and a pair of mounting brackets secured to said sleeve so that the sleeve is held between the brackets, said mounting brackets being secured to said member.

Preferably, the mounting brackets are secured to the member by rivetting.

The assembly can be produced with a minimum of distortion by rivetting the brackets to the member with the sleeve held in position between the brackets, brazing, preferably by a resistance brazing technique, the brackets to the sleeve, sizing the bore in the sleeve to the required diameter, and pressing the bearing into the sleeve.

Figure 2:
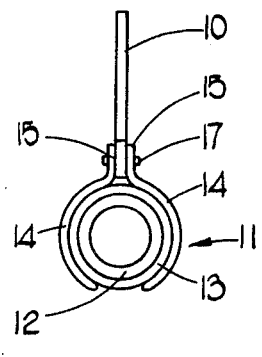

An embodiment of the present invention will now be described, by way of example, with reference to the accompanying drawing, in which:

FIG. 1 is a side elevation of a pump vane to which a bearing assembly according to the present invention is secured, and FIG. 2 is an end view of the pump vane and bearing assembly of FIG. 1.

In the drawing, the vane 10 is of planar form and is supported, in use, on a shaft (not shown) by two bearing assemblies 11. Each bearing assembly 11 comprises a roller 12 press fitted into an annular sleeve 13. Each bearing assembly 11 also comprises a pair of mounting brackets 14 which are of arcuate form and which are brazed to the annular sleeve 13 so that the latter is held between the brackets 14. The sleeve 13 and brackets 14 are plated with a layer of copper, typically 0.0003 - 0.0006 inch thick. Each mounting bracket 14 is secured to a root portion of the vane 10 by means of an integral flange 15. Each flange 15 is common to one mounting bracket in each assembly 11. The root portion 16 is sandwiched between the two flanges 15 and held in position by four rivets 17 passing through the flanges and the root portions 16. The roller bearings 12 are in axial alignment.

During manufacture of the above described bearing assembly, the mounting brackets 14 are first rivetted by means of their flanges 15 to the root portion 16 of the vane 10. Then, the annular sleeves 13 are inserted between the respective mounting brackets 14 and secured in position by means of a resistance brazing technique. Following this, the sleeves 13 are fine bored so as to size the bores in the sleeves 13 to the required diameter. Lastly, the bearings 12 are pressed into the respective sleeves 13.

Not only does the above described bearing assembly reduce the risk of high stresses being introduced compared with the above described prior art arrangement, but also it has been found that the pressing operation used to mount the bearings in the sleeves 13 is easier and the resistance brazing technique which can be employed is more economical than in the manufacture of the above described prior art arrangement.

I claim:
1. A bearing assembly for rotatably supporting a member for rotation about a shaft, said bearing assembly comprising a bearing adapted to be rotatably mounted on the shaft, a sleeve into which said bearing is fitted, and a pair of mounting brackets secured to said member, said mounting brackets being secured to said sleeve and being elongated so that they embrace diametrically opposite portions of said sleeve.

2. The bearing assembly as claimed in claim 1, wherein rivets secure said mounting brackets to said member, said rivets being inserted before said mounting brackets are secured to said sleeve.

3. The bearing assembly as claimed in claim 1, wherein said mounting brackets are brazed to said sleeve.

4. The bearing assembly as claimed in claim 1, wherein each said mounting bracket has an integral flange portion to which is integrally connected a respective mounting bracket of a further identical bearing assembly, said mounting brackets being secured to said member by means of said integral flange portions.

* * * * *